(12) United States Patent
Boswell et al.

(10) Patent No.: US 11,034,415 B2
(45) Date of Patent: Jun. 15, 2021

(54) PERMEABLE CONCRETE VESSEL FOR CREATING FLOATING AQUATIC HABITATS

(71) Applicant: Ohio State Innovation Foundation, Columbus, OH (US)

(72) Inventors: Jacob Ross Boswell, Columbus, OH (US); Martin Koelsch, Columbus, OH (US); Lisa E. Burris, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 266 days.

(21) Appl. No.: 16/157,734

(22) Filed: Oct. 11, 2018

(65) Prior Publication Data

US 2019/0112012 A1 Apr. 18, 2019

Related U.S. Application Data

(60) Provisional application No. 62/571,536, filed on Oct. 12, 2017.

(51) Int. Cl.
*A01G 31/02* (2006.01)
*B63B 35/44* (2006.01)
(Continued)

(52) U.S. Cl.
CPC .............. *B63B 35/44* (2013.01); *A01G 31/02* (2013.01); *C04B 28/04* (2013.01); *A01G 24/25* (2018.02);
(Continued)

(58) Field of Classification Search
CPC .. A01G 31/02; A01G 24/25; A01G 2031/006; A01G 25/00
(Continued)

(56) References Cited

U.S. PATENT DOCUMENTS 2,531,562 A * 11/1950 Eve .......................... A01G 9/028
47/80
2,939,247 A * 6/1960 Palumbo ................. A01G 9/021
47/65.7

(Continued)

OTHER PUBLICATIONS

Nakamura, K., Mueller, G., "Review of the Performance of the Artificial Floating Island as a Restoration Tool for Aquatic Environments," World Environmental and Water Resources Congress 2008.
(Continued)

*Primary Examiner* — Ebony E Evans
(74) *Attorney, Agent, or Firm* — Wood Herron & Evans LLP

(57) ABSTRACT

A permeable floating concrete vessel for creating floating aquatic habitats is disclosed. The vessel includes an interior space to hold growth material and a plant. The vessels includes one or more channels so a root of the plant can extend through the channel and into a body of water in which the vessel is secured. The vessel is made from a buoyant material, such as water-permeable concrete material. In an exemplary embodiment the water-permeable concrete material includes a mixture of cement, glass microspheres, expanded glass aggregate, and microfibers. Two or more vessels may be connected together via a connecting member to form an array of the vessels.

13 Claims, 5 Drawing Sheets

(51) Int. Cl.

| | | |
|---|---|---|
| *C04B 28/04* | (2006.01) | |
| *C04B 111/42* | (2006.01) | |
| *A01G 24/25* | (2018.01) | |
| *C04B 14/22* | (2006.01) | |
| *B63B 35/38* | (2006.01) | |
| *C04B 111/00* | (2006.01) | |
| *B63B 5/14* | (2006.01) | |

(52) U.S. Cl.
CPC ............... *B63B 5/14* (2013.01); *B63B 35/38* (2013.01); *B63B 2035/4493* (2013.01); *C04B 14/22* (2013.01); *C04B 2111/00758* (2013.01); *C04B 2111/42* (2013.01)

(58) Field of Classification Search
USPC ............ 119/207, 208, 221, 222, 238; 47/64
See application file for complete search history.

(56) References Cited

U.S. PATENT DOCUMENTS

| | | | | |
|---|---|---|---|---|
| 3,752,685 | A | * | 8/1973 | Honda ............... C03C 11/002 |
| | | | | 106/409 |
| 3,979,217 | A | * | 9/1976 | Sutton ............... B28B 1/008 |
| | | | | 106/675 |
| 4,111,713 | A | * | 9/1978 | Beck ............... B29C 70/66 |
| | | | | 106/409 |
| 4,312,296 | A | * | 1/1982 | Stelleman ............ A01K 61/60 |
| | | | | 119/223 |
| 4,508,057 | A | * | 4/1985 | Suzuki ............... C12N 1/12 |
| | | | | 119/221 |
| 4,926,584 | A | * | 5/1990 | Horibata ............ A01G 31/02 |
| | | | | 47/59 R |
| 5,048,219 | A | * | 9/1991 | Georgescu ............ A01K 93/00 |
| | | | | 43/17 |
| 5,799,440 | A | * | 9/1998 | Ishikawa ............ A01G 9/029 |
| | | | | 47/65 |
| 6,025,042 | A | * | 2/2000 | Kligman ............ A41G 1/00 |
| | | | | 428/24 |
| 6,986,845 | B2 | | 1/2006 | DeBusk et al. |
| 7,448,163 | B2 | * | 11/2008 | Beeman ............ A01G 9/00 |
| | | | | 47/60 |
| 7,555,866 | B2 | | 7/2009 | Kania et al. |
| 7,784,218 | B2 | | 8/2010 | Kania et al. |
| 7,789,043 | B2 | | 9/2010 | Kania et al. |
| 7,810,279 | B2 | | 10/2010 | Kania et al. |
| 7,941,970 | B2 | | 5/2011 | Kania et al. |
| 8,132,364 | B2 | | 3/2012 | Kania et al. |
| 8,147,165 | B2 | * | 4/2012 | Sung ............ A01G 33/00 |
| | | | | 405/25 |
| 8,250,808 | B2 | | 8/2012 | Kania et al. |
| 8,327,579 | B2 | | 12/2012 | Kania et al. |
| 8,382,982 | B2 | | 2/2013 | Hondulas |
| 8,691,092 | B2 | | 4/2014 | Streb |
| 9,181,105 | B2 | | 11/2015 | Kania et al. |
| 2004/0020116 | A1 | * | 2/2004 | Schuck ............ A01G 9/02 |
| | | | | 47/65.5 |
| 2004/0187418 | A1 | * | 9/2004 | Day ............ A01G 9/00 |
| | | | | 52/315 |
| 2009/0139927 | A1 | * | 6/2009 | Kania ............ A01G 31/00 |
| | | | | 210/602 |
| 2009/0165374 | A1 | | 7/2009 | Kania et al. |
| 2009/0288341 | A1 | | 11/2009 | Kania et al. |
| 2010/0075400 | A1 | | 3/2010 | Kania et al. |
| 2010/0088955 | A1 | | 4/2010 | Kania et al. |
| 2010/0236148 | A1 | | 9/2010 | Kania et al. |
| 2010/0236149 | A1 | | 9/2010 | Kania et al. |
| 2012/0058248 | A1 | | 3/2012 | Stephen et al. |
| 2013/0125825 | A1 | | 5/2013 | Kania et al. |
| 2013/0145968 | A1 | * | 6/2013 | Scanlan ............ C04B 2103/54 |
| | | | | 106/676 |
| 2018/0026579 | A1 | | 1/2018 | Kania et al. |

OTHER PUBLICATIONS

Yeh, N., Yeh, P., Tuan-Hsiou, C., "Artificial Floating Islands for Environmental Improvement," Renewable and Sustainable Energy Reviews 47 (2015) 616-622.

Van Seters, T., Smith, D., Macmillan, G., "Performance Evaluation of Permeable Pavement and a Bioretention Swale," 8th International Conference on Concrete Block Paving, Nov. 6-8, 2006, 161-170.

Chang, N., Islam, K., Marimon, Z., Waneilista. M., "Assessing biological and chemical signatures related to nutrient removal by floating islands in stormwater mesocosms," Chemosphere 88 (2012) 736-743.

Chen, S., Chao, L., Zhao, J., et al., "Application and Development of Artificial Floating Island Technology," Applied Mechanics and Materials vols. 587-589 (2014) 696-700.

Cai, L. X., "The Construction Method and Plant Configuration of New-Style Ecological Floating Island," Advanced Materials Research vols. 573-574 (2012) 223-227.

Masters, B., "The ability of vegetated floating Islands to improve water quality in natural and constructed wetlands: a review," Water Practice and Technology vol. 7 No. 1 (2012).

Fang, Xinyue, Qie Li, Tao Yang, Zhihong Li, and Yumei Zhu, "Preparation and characterization of glass foams for artificial floating island from waste glass and $Li_2CO_3$," Construction and Building Materials. 134 (2017) 358-363.

Hu, Guang-Ji, Min Zhou, Hao-Bo Hou, Xi Zhu, and Wei-Hao Zhang, "An ecological floating-bed made from dredged lake sludge for purification of eutrophic water," Ecological Engineering 36 (2010) 1448-1458.

* cited by examiner

PERMEABLE CONCRETE VESSEL FOR CREATING FLOATING AQUATIC HABITATS

CROSS REFERENCE TO RELATED APPLICATION

This application claims the benefit of U.S. Provisional Application Ser. No. 62/571,536 filed on Oct. 12, 2017, the disclosure of which is incorporated by reference in its entirety.

TECHNICAL FIELD

The invention generally relates to artificial floating islands and, more particularly, to permeable floating concrete vessels for creating floating aquatic habitats.

BACKGROUND

Many water bodies of the world suffer from the disastrous, and deeply interrelated, combination of nearby wetland habitat loss, nutrient loading and hazardous algal blooms. This problem is seen throughout the Unites States at scales ranging from nutrient heavy storm water ponds, to drinking water reservoirs, to the Great Lakes, to the Gulf of Mexico. Historically, functional wetlands and floodplains helped to create robust aquatic ecosystems that were resilient enough to hold off the process of eutrophication and the formation of hazardous algal blooms. Today however, these critical ecosystems have largely been replaced by human development resulting in numerous water bodies that, during summer months, experience the growth of algae. This problem impacts critical habitat, drinking water resources, recreation and tourism, and will only get worse as rising global temperatures create better conditions for hazardous algae and increased pressure on freshwater resources. Yet, solutions have been slow in coming as large scale habitat, wetland and floodplain restoration projects invariably require the purchase of valuable private land and coordination between multiple landowners.

Artificial Floating Islands (AFIs) have been shown to produce beneficial effects such as nutrient load reductions, phytoplankton reduction, heavy metal uptake, and habitat creation in a number of applications including in municipal and residential storm water ponds, industrial wastewater and effluent ponds, lakes, rivers and water supply reservoirs. Most contemporary AFIs are based on naturally occurring floating islands which are typically thin mats of floating organic material which can support a range of floating and emergent wetland plants. Thus, conventional AFIs mimic this natural condition, consisting of a floating plastic mat that sustains a soilless planting medium that is typically planted with emergent wetland vegetation native to the location in which it is applied. Research has shown that AFIs are effective via three primary mechanisms, bio-mass production, shade, and water exposure around the root zone. Despite this success, concerns over existing types of AFIs arise from their use of plastics in the construction of the artificial floating mat. Plastics have been shown to leach antimony (Sb) and estrogenic chemicals into water—raising concerns around their use in drinking water reservoirs and in situations where animal habitat may be affected. Moreover, plastic floating wetlands may pose a danger to fish and other wildlife that become trapped in them. Last, concerns have been raised that plastic islands may simply add to the overwhelming quantity of waste plastic debris in water bodies.

Accordingly, there exists a need to provide a device for creating floating aquatic habitats while avoiding or minimizing such plastics.

SUMMARY

In one embodiment, a vessel for providing a floating aquatic habitat in a body of water includes a conically-shaped sidewall defining an interior space for holding a growth medium and a plant, the sidewall including one or more channels extending through the sidewall such that a root of the plant may extend through the sidewall and into the body of water. The conically-shaped sidewall is formed of a buoyant material. In one embodiment of the vessel, the buoyant material is a water-permeable concrete material.

In one embodiment of the vessel, the vessel further a fastener secured to a bottom of the conically-shaped sidewall. The fastener maybe a swivel eye bolt.

In another embodiment, a vessel for providing a floating aquatic habitat in a body of water includes a curved sidewall and a bottom member coupled to the curved sidewall to define an interior space for holding a growth medium and a plant, the bottom member includes one or more channels extending through the bottom member such that a root of the plant may extend through the bottom member and into the body of water. The curved sidewall and bottom member are formed of a buoyant material. In one embodiment of the vessel, the buoyant material is a water-permeable concrete material. In another embodiment, the bottom member is curved so as to form a trough where the bottom member and the curved sidewall meet and further form a depression at a center of the bottom surface.

In any of the embodiments, the water-permeable concrete material is made from 1 part cement, 1 part lightweight coarse aggregate, 2 parts lightweight fine aggregate, 1 part glass microspheres, and 1 part water. In any of the embodiments, the water-permeable concrete material includes a mixture of cement, glass microspheres, expanded glass aggregate, and microfibers. That mixture may include by weight percent 30-40% cement, 30-35% water, 15-20% glass microspheres, 10-15% expanded glass aggregate, and 0.05% microfibers.

In another embodiment, an array of vessels for providing a floating aquatic habitat in a body of water includes at least two vessels with each vessel including a curved sidewall and a bottom member coupled to the curved sidewall to define an interior space for holding a growth medium and a plant, the bottom member includes one or more channels extending through the bottom member such that a root of the plant may extend through the bottom member and into the body of water. The curved sidewall and bottom member are formed of a buoyant material. A connecting member connects the at least two vessels together.

In one embodiment, the connecting member has an inset groove that is sized and shaped so as to rest upon and engage an uppermost portion of the curved sidewall. The connecting member further includes a lashing to secure the connecting member to the at least two vessels. The lashing passes through at least one passage in the curved sidewall of each vessel.

In one embodiment, the connecting member has at least two curved edge members shaped to conform to the curved sidewall of each vessel. The connecting member further including a lashing to secure the connecting member to the at least two vessels such that one of the at least two curved edge members abuts the curved sidewall of one of the at least two vessels and the other of the at least two curved edge members abuts the curved sidewall of the other of the at least two vessels. The lashing passes through at least one passage in the curved sidewall of each vessel. In a further embodiment, each of the at least two curved edge members is lined with a resilient member and contacts the curved sidewall of the at least two vessels when the connecting member is secured to the at least two vessels.

BRIEF DESCRIPTION OF THE DRAWINGS

The accompanying drawings, which are incorporated in and constitute a part of this specification, illustrate various embodiment of the invention and, together with the general description of the invention given above, and the detailed description of the embodiments given below, serve to explain the embodiments of the invention.

DETAILED DESCRIPTION

Figure 1:
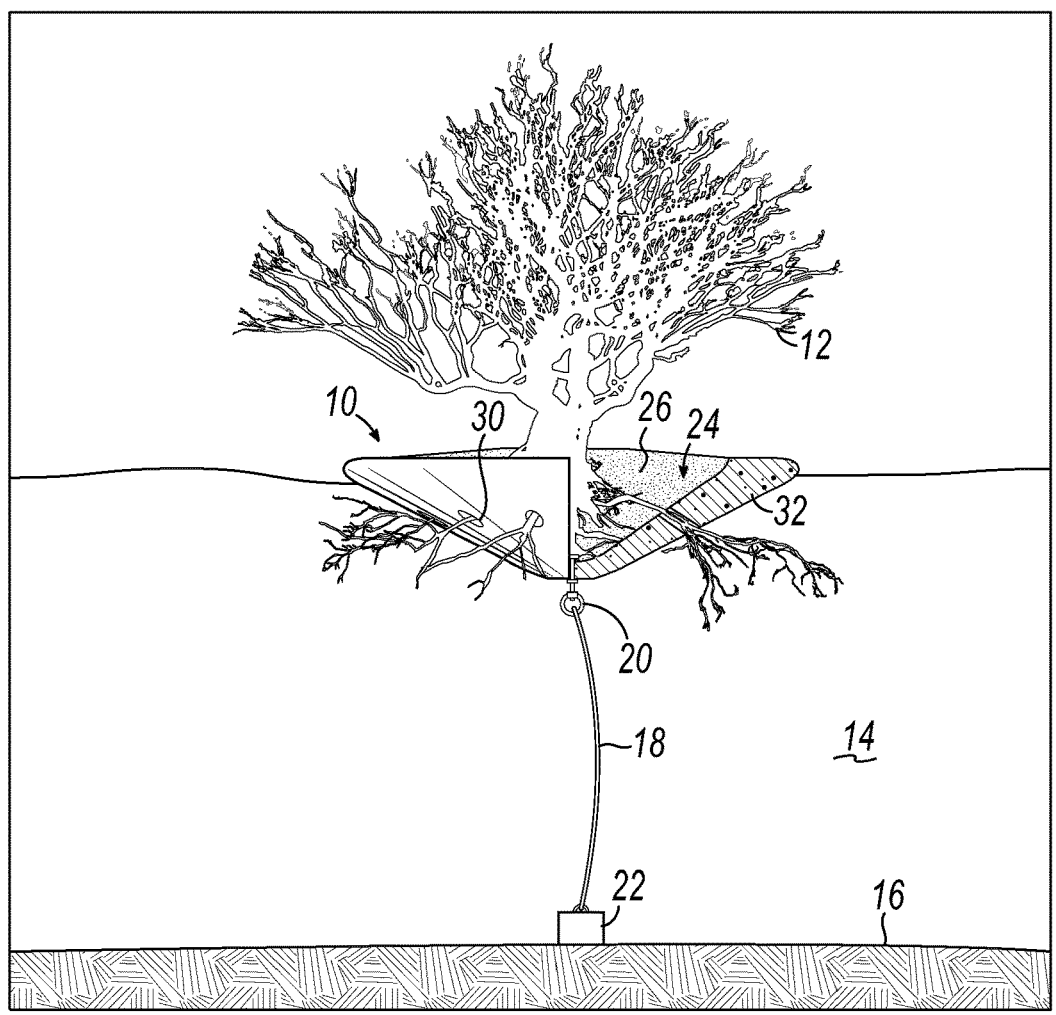
FIG. 1 is a schematic view of a permeable floating concrete vessel holding a plant, the vessel floating in water.
Figure 2:
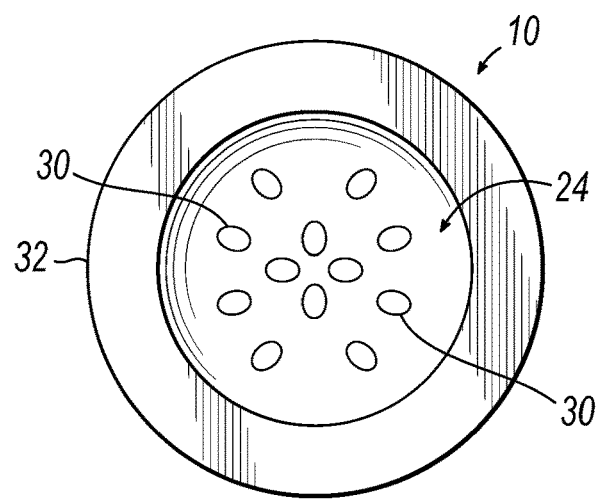
FIG. 2 is a top view of the permeable floating concrete vessel of FIG. 1.

The present invention overcomes the deficiencies of prior AFIs by providing a new type of AFI made of water-permeable floating concrete. FIGS. 1 and 2 show an exemplary permeable floating concrete vessel (PFCV) 10 holding a plant 12, where the PFCV 10 is floating in a body of water 14, such as a pond, lake, stream, river, bay, swamp, marsh, ocean, sea and the like. The plant 12 may be a water loving tree species such as a willow or cypress as well as a large range of other edge and emergent wetland species. The PFCV 10 will allow for larger biomass production, more shade, and larger root zone exposure while eliminating concerns around the use of plastic in AFIs.

As shown in FIG. 1, the PFCV 10 is secured to a bottom surface 16 of the body of water 14 via a cable 18 extending between a fastener 20, such as a swivel eye bolt, secured to the bottom of the PFCV 10 and an anchor block 22 resting upon or affixed to the bottom surface 16. The exemplary PFCV 10 has a generally conical shape that defines interior space 24. The interior space 24 is sized to provide sufficient room for the plant 12 and a hydroponic growth medium 26, such as coconut coir. The plant 12 has a series of roots 28 that extend through the PFCV 10 via a plurality of through holes or channels 30 extending through a sidewall 32 of the PFCV 10. The sidewall 32 may be made of any buoyant material, but is preferably made of concrete as will be discussed in greater detail below. The channels 30 permit the roots 28 to extend beyond the PFCV 10 and into the body of water 14 so that the plant 12 can be sufficiently hydrated without human intervention or irrigation systems. By using a swivel eye bolt for fastener 20, the PFCV 10 can spin in the body of water 14 because of currents or wind. The spinning may enhance the root exposure value of the plant 12 and/or allow the PFCV 10 to passively enhance the surface agitation and thus aerate the surrounding water.

The sidewall 32 is thicker at the top of the PFCV 10 and tapers down in thickness at the bottom of the PFCV 10. Although the sidewall 32 is shown with thicker top and tapering down, the sidewall 32 could be of uniform thickness depending on the loading conditions for a particular PFCV 10. The channels 30 may have diameters ranging from 0.25 inches to 1.00 inches. Each channel 30 need not have the same diameter. The number and location of the channels 30 in the sidewall 32 can vary and is not limited to what is shown in FIGS. 1 and 2. The channels 30 may have cross-sectional shapes (e.g., oval, triangular, square, star, polygon) different from the cross-sectional shape shown in FIGS. 1 and 2.

Figure 3:
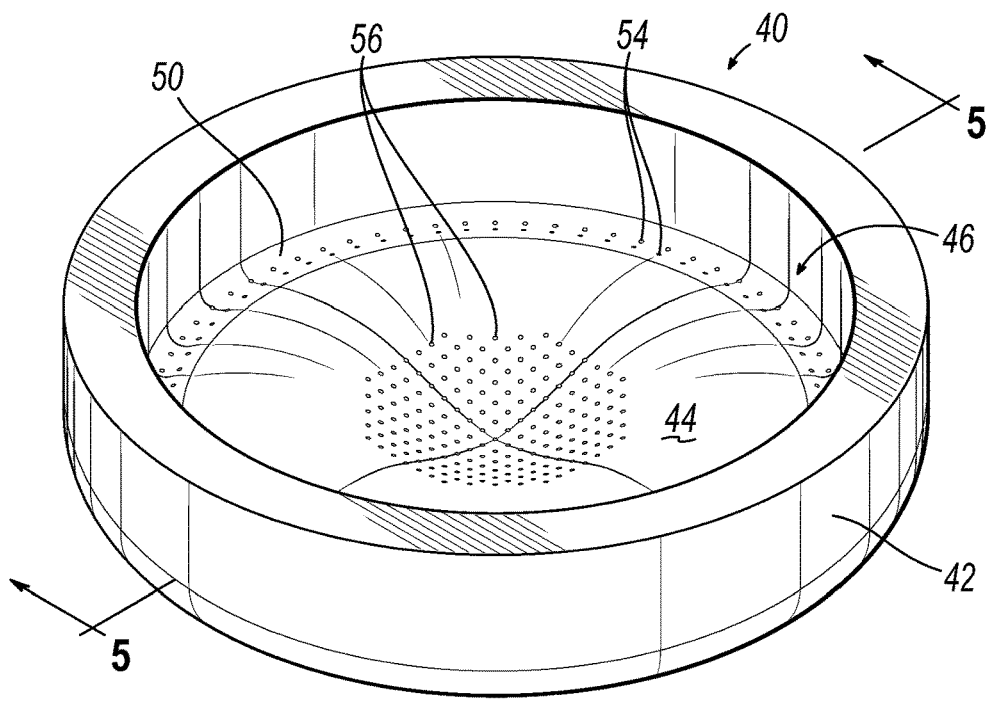
FIG. 3 is a perspective view of another exemplary permeable floating concrete vessel.
Figure 4:
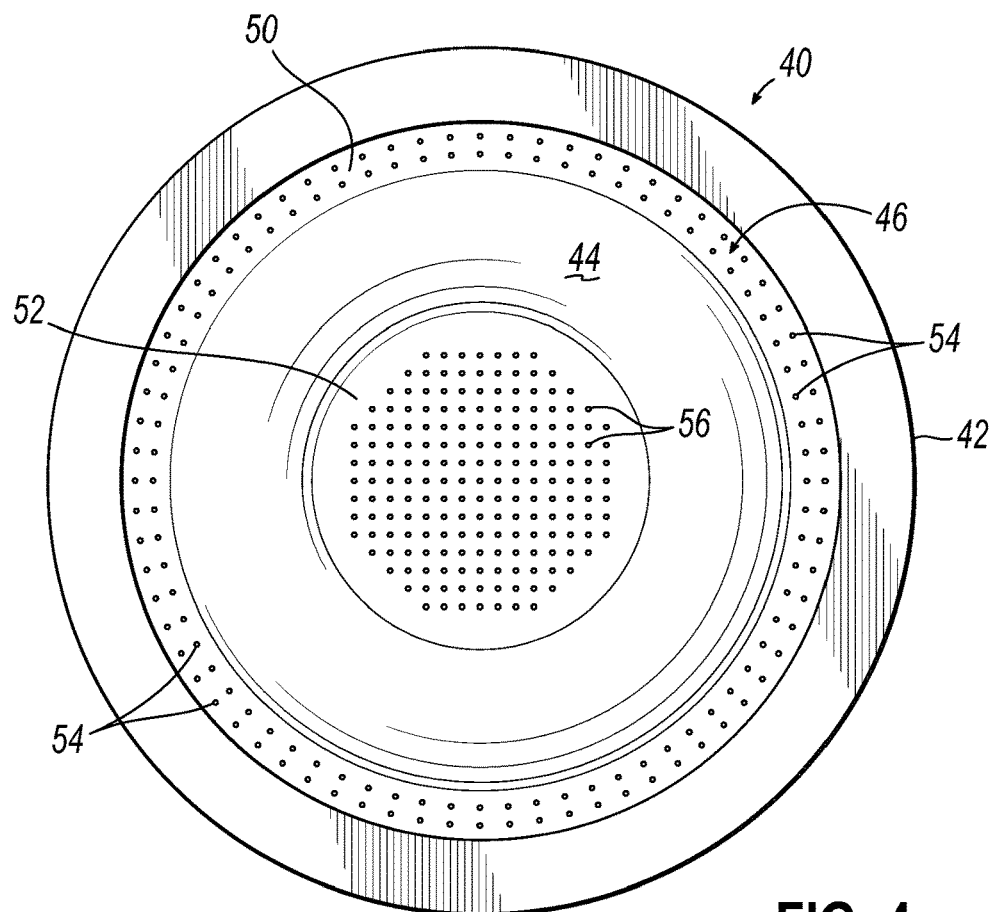
FIG. 4 is a top view of the permeable floating concrete vessel of FIG. 3.
Figure 5:
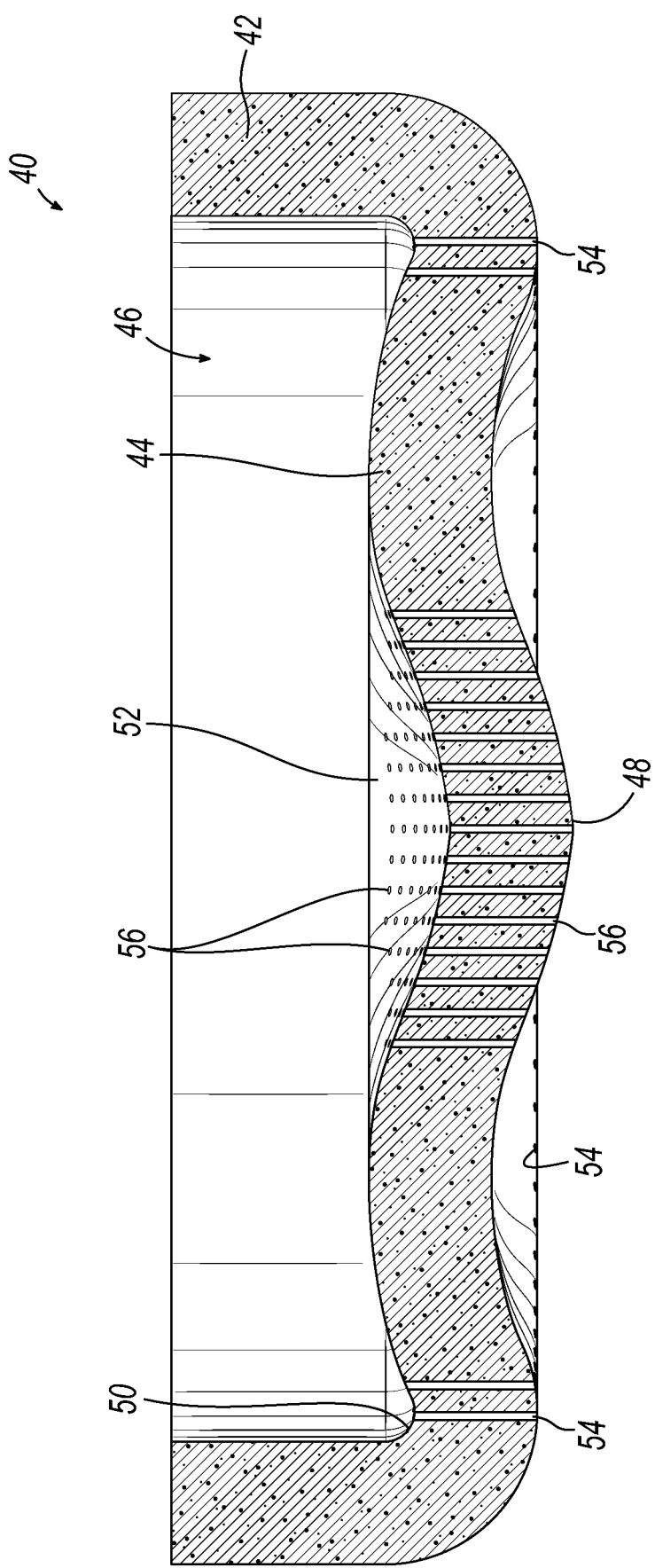
FIG. 5 is a cross sectional view of the permeable floating concrete vessel taken along section line 5-5 of FIG. 3.

Another exemplary PFCV 40 is shown in FIGS. 3-5. Like the PFCV 10, the PFCV 40 is intended to float in the body of water 14 and be anchored to the bottom surface 16 via cable 18 extending between a fastener in the PFCV 40 and the anchor block 22. The PFCV 40 has a curved sidewall 42 and a bottom member 44 that define an interior space 46. The curved sidewall 42 and the bottom member 44 have similar uniform thickness, but could be of different thicknesses depending on the loading parameters for the PFCV 40. As shown in FIG. 5, the bottom member 44 curves from the sidewall 42 to a center 48 of the PFCV 40 to form a trough 50 where the bottom member 44 meets the sidewall 42. The bottom member 44 also forms a depression 52 around the center 48. While the cross-sectional profile of the bottom member 44 is illustrated with a particular curved shape in FIGS. 3-5, the cross-sectional profile of the bottom member 44 is not limited to that illustrated profile. The cross-sectional profile of the bottom member 44 could be of any curved profile, such as sinusoidal or it could be flat. A plurality of through holes or channels 54 extend through the bottom member 44 at the trough 50. Another plurality of through holes or channels 56 extend through the bottom member 44 at the depression 52. While the PFCV 40 has both channels 54 and 56, the PFCV 40 could alternatively have only channels 54 or only channels 56. The channels 54, 56 may have diameters ranging from 0.25 inches to 1.00 inches. Each channel 54, 56 need not have the same diameter. The number and location of the channels 54, 56 in the sidewall 42 can vary and is not limited to what is shown in FIGS. 1 and 2. The channels 54, 56 may have cross-sectional shapes (e.g., oval, triangular, square, star, polygon) different from the cross-sectional shape shown in FIGS. 3-5.

The interior space 46 of the PFCV 40 is sized to provide sufficient room for a plant and a growth medium, such as soil. Once established, the roots of the plant will extend through channels 54, 56 and into the water so the plant may be sufficiently hydrated.

Figure 6:
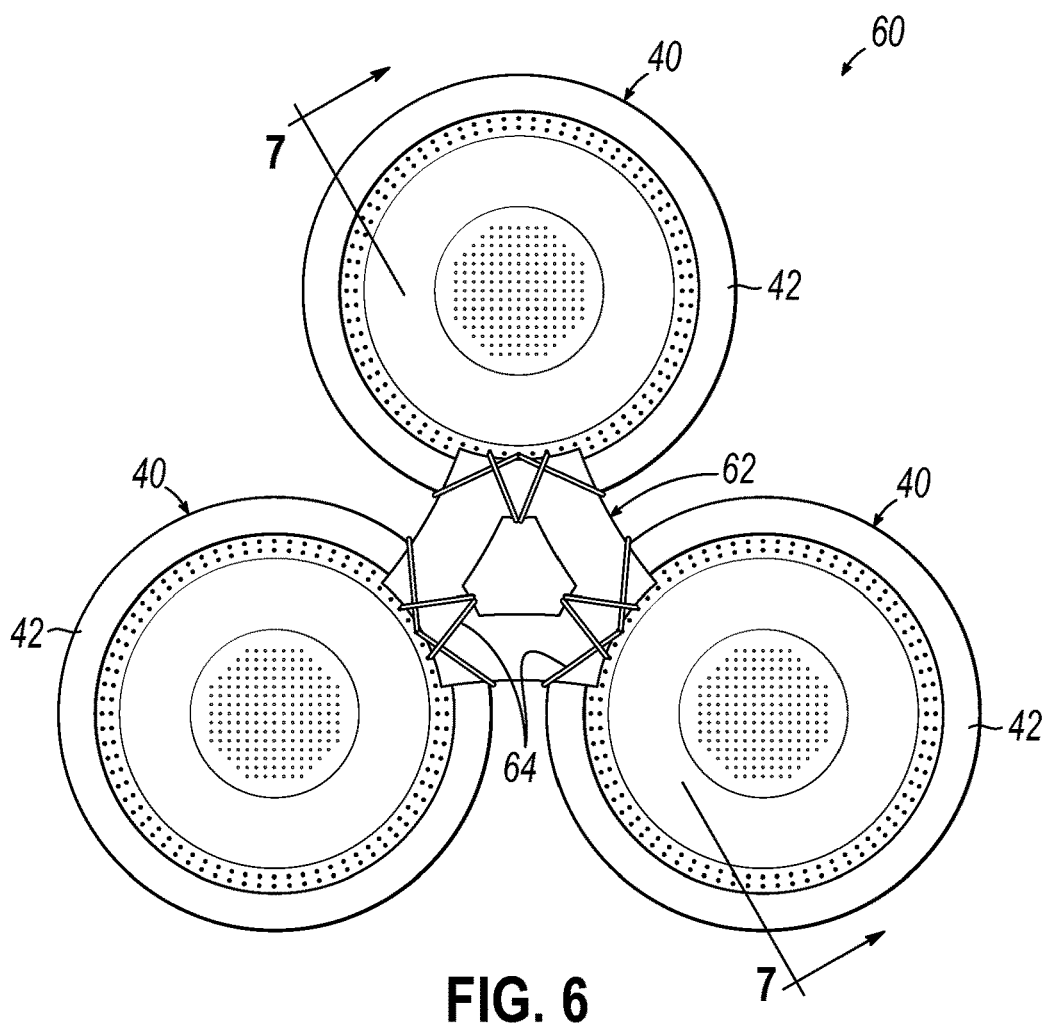
FIG. 6 is an exemplary array of three permeable floating concrete vessels of FIG. 3 secured to one another.
Figure 7:
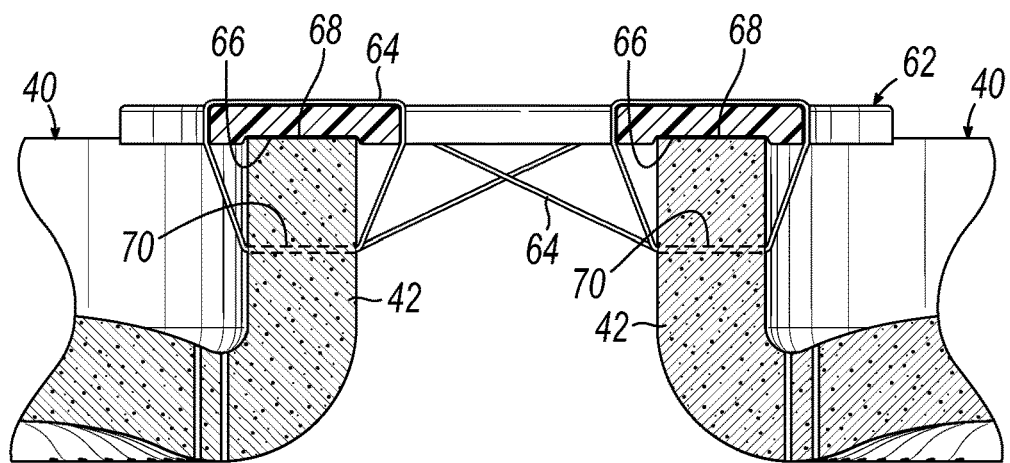
FIG. 7 is a cross sectional view of the array taken along section line 7-7 of FIG. 6.

FIGS. 6 and 7 show three PFCV 40 secured together to form an array 60. A connecting member 62 secures the three PFCV 40 together via a lashing 64. The connecting member 62 may be made of marine grade plywood, plastic, or fiberglass. The lashing 64 could be marine spring line, cable, cord, wire, rope, chain, or the like. As shown in FIG. 7, the connecting member 62 has an inset groove 66 that is sized and shaped so that the inset groove rests upon and engages the uppermost portion 68 of the sidewall 42 of the three PFCV 40. The sidewall 42 has one or more passages 70 through which the lashing 64 passes to positively secure the connecting member to the three PFCV 40. While FIG. 6 shows only three PFCV 40 secured together to form the array 60, one or more additional PFCV 40 may be secured to the existing PFCV 40 by employing one or more connecting members 62 to further expand the array 60. Alternatively, one of the three existing PFCV 40 may be removed leaving the array 60 with only two PFCV 40 secured together by connecting member 62.

Figure 8:
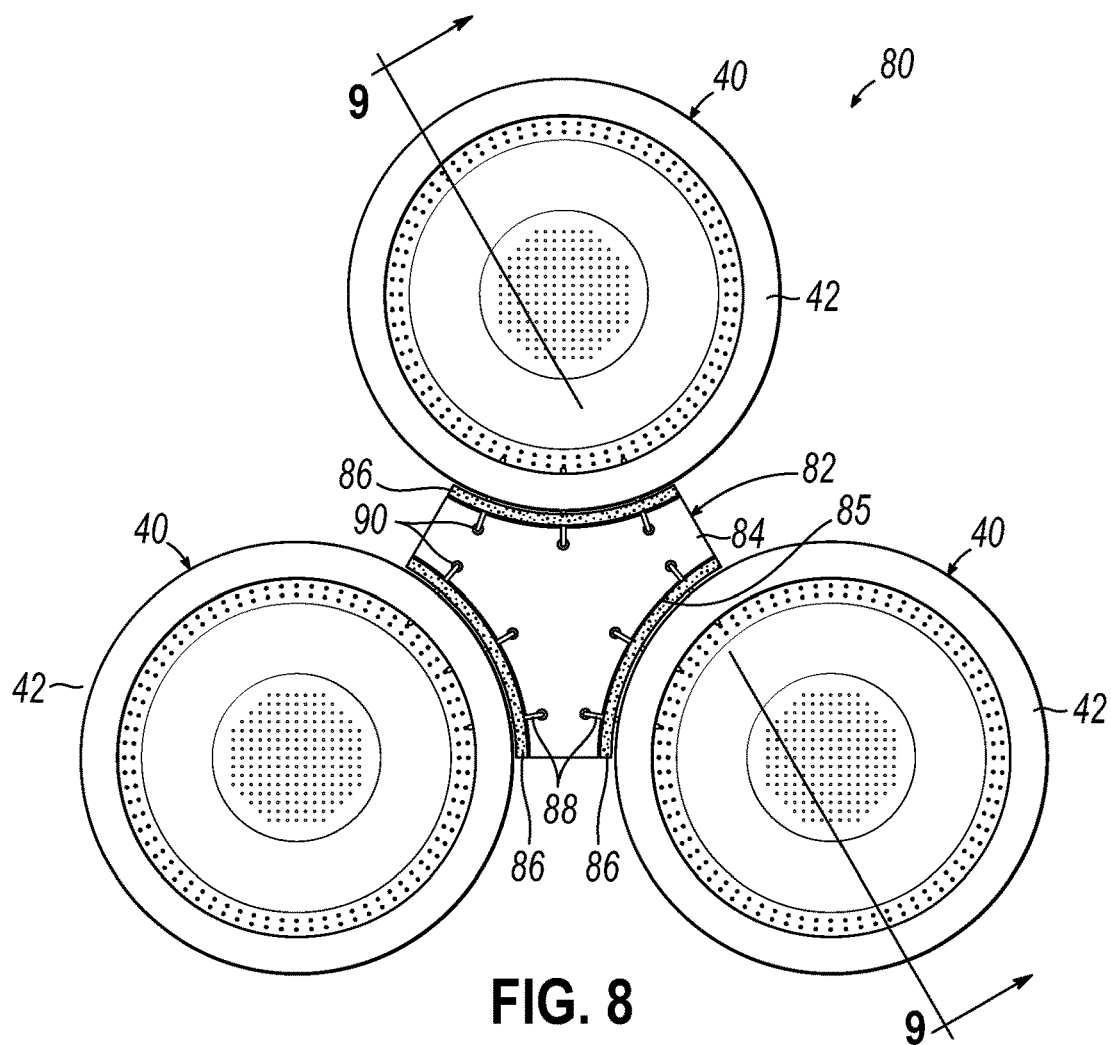
FIG. 8 is another exemplary array of three permeable floating concrete vessels of FIG. 3 secured to one another.
Figure 9:
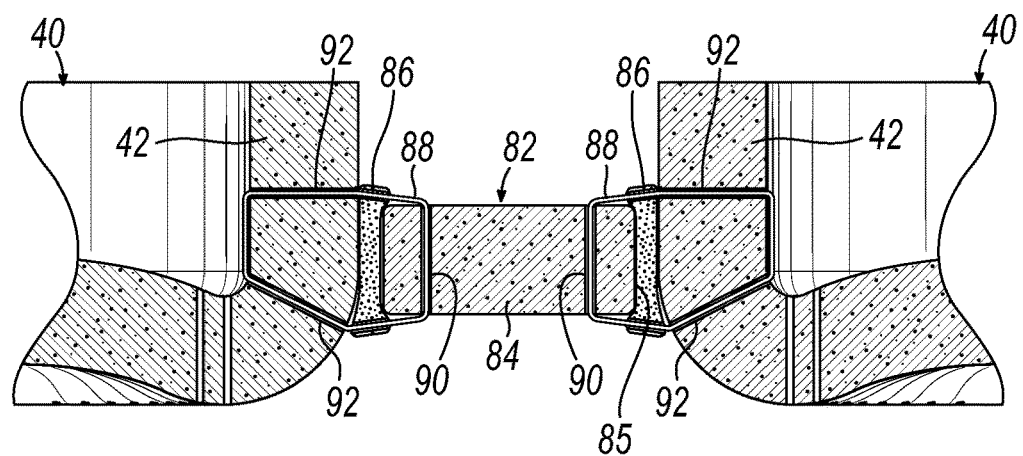
FIG. 9 is a cross sectional view of the array taken along section line 9-9 of FIG. 8.

FIGS. 8 and 9 show an array 80 of three PFCV 40 secured together via a connecting member 82. The connecting member 82 is positioned lower on the sidewalls 42 of the PFCV 40 compared to the position of the connecting member 62 used in array 60. The connecting member 82 includes a main body member 84 with curved edge members 85 shaped to conform to the exterior of the curved sidewalls 42 and resilient members 86 coupled to the curved edge members 85. The resilient members 86 contact the exterior of the curved sidewalls 42 when the connecting member 82 is connecting to the PFCV 40. The connecting member 82 is secured to the three PFCV 40 via lashings 88 that pass through one or more passages 90 in the main body member 84 and one or more passages 92 in the sidewalls 42 of the PFCV 40. The main body member 84 is made of concrete, but could be make of any other suitable material. The resilient member 86 is made of rubber, such as polyurethane, but could be make of any other suitable resilient member. While FIG. 8 shows only three PFCV 40 secured together to form the array 80, one or more additional PFCV 40 may be secured to the existing PFCV 40 by employing one or more connecting members 82 to further expand the array 80. Alternatively, one of the three existing PFCV 40 may be removed leaving the array 80 with only two PFCV 40 secured together by connecting member 82.

In one embodiment, the PFCV 10, 40 are cast from a porous, lightweight concrete material. The cement and aggregate used in the production of the PFCVs may be naturally occurring. In one embodiment, the concrete blend used for casting PFCVs may include, for example, standard portland cement, the naturally abundant volcanic glass perlite, and chemically inert micro glass spheres. This combination allows the resulting concrete to be porous to the water around it while remaining buoyant. In one embodiment, the ingredients of the concrete mixture may include 1 part cement, 1 part lightweight coarse aggregate, 2 parts lightweight fine aggregate, 1 part glass microspheres, and 1 part water. In an exemplary embodiment, the lightweight coarse aggregate may be coarse perlite and the lightweight fine aggregate may be fine perlite. In another embodiment, the concrete mixture may include the ingredients listed in Table 1.

TABLE 1

| Materials | Batch Weight (kg/m$^3$) | Material Proportion Ranges (Weight %) |
| --- | --- | --- |
| Cement | 500 | 30-40 |
| Water | 467 | 30-35 |
| Glass Microspheres | 260 | 15-20 |
| Expanded Glass Aggregate | 260 | 10-15 |
| Microfibers | 0.6 | 0.05 |
| Air Entrainer | | 400 mL/100 kg cement |

In the table above, the cement may be ordinary portland cement (Types I/II). The glass microspheres may have a specific gravity of about 0.37 with an average size of about 45 micron diameter. The expanded glass aggregate may have a specific gravity of about 0.19 with sizes ranging from about 0.1-4 mm diameter. The microfibers may be nylon fibers meeting ASTM C1116 for Type II fibers. The microfibers may have a typical length in the range of about 12-20 mm. While two concrete formulations are disclosed, it will be appreciated that the invention is not limited to these particular formulations.

Assuming that the PFCV 40 has an outer diameter of about 4 feet, the sidewall 42 and bottom member 44 are 4 inches thick and made from the concrete mixture in the Table 1, the PFCV 40 should be able to carry, i.e., remain afloat, about 524 pounds (237.8 kg) of material (soil and vegetation).

Constructing the PFCV 10, 40 from concrete provides several advantages over typical mat-variety AFIs. First, PFCVs can be easily cast via standard concrete casting techniques into a variety of shapes (e.g., cones, dishes) and sizes, thereby making production both cheaper and easier. Second, by using naturally occurring and chemically inert materials PFCVs eliminate concerns around antimony and estrogenic chemical leaching in water. Third, abandoned and submerged PFCVs pose little possibility for wildlife to become trapped within them because they are rigid rather than woven. Fourth, despite being concrete, PFCVs are substantially light-weight and thus are easy to transport and deploy.

By creating a vessel rather than the traditional floating mat, PFCVs allow for a much larger soil volume than traditional AFIs. This additional soil volume and buoyancy can be used to support much larger wetland species, creating a larger area for the root zone to be exposed to water and potentially more biomass. Traditional AFIs rely mostly on herbaceous perennial wetland species that require minimal soil volume—typically emergent macrophytes such as reeds, rushes, and sedges—thus mimicking a typical marsh-like plant community. PFCVs on the other hand may be used to support marsh-like conditions while also sustaining much larger aquatic species such as willow (salix) and cypress (taxodium). Thus, through their increased capacity, PFCVs are able to take on the landscape and habitat function of both marsh-type wetlands and swamp-type wetlands.

PFCVs are permeable, meaning there is a direct exchange between the planting medium, the roots, and the surround water. Unlike a normal floating vessel, such as a boat, which achieves buoyancy largely via displacement, the PFCV achieves buoyancy via the extreme low density of its aggregate. The low density aggregate allows the PFCV to take on the shape and volume of a traditional boat-like vessel while remaining permeable to the surrounding water.

The PFCVs disclosed herein may allow the reintroduction of functional edge ecologies within even the deepest parts of freshwater bodies. The PFCVs and the plants they support may provide shade over open water, reducing the amount of light that hazardous algae need to grow and slowing the rate at which these bodies of water heat-up during the summer months. Additionally, the ecologies these PFCVs support may take up excess nitrogen and phosphorous and store it within the living tissue of the plants. The porous concrete mixture allows for direct communication between the roots of the plants supported by the vessel and surrounding water, allowing excess nutrients in the water to be taken up while providing an edge-like habitat for lacustrine fish, waterfowl, reptiles, and amphibians. The durability of the concrete makes the PFCVs appropriate for use over long periods in deep-water situations. And, unlike existing AFIs made of recycled plastic, the materials used in the PFCVs fabrication are chemically inert and naturally occurring.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An array of vessels for providing a floating aquatic habitat in a body of water comprising:
    at least two vessels, each vessel comprising:
        a curved sidewall; and
        a bottom member coupled to the curved sidewall to define an interior space for holding a growth medium and a plant, the bottom member including one or more channels extending through the bottom member such that a root of the plant may extend through the bottom member and into the body of water,
        wherein the curved sidewall and the bottom member are formed of a buoyant material; and
    a connecting member connecting the at least two vessels together,
    wherein the connecting member has an inset groove that is sized and shaped so as to rest upon and engage an uppermost portion of the curved sidewall, the connecting member further including a lashing to secure the connecting member to the at least two vessels, the lashing passing through at least one passage in the curved sidewall of each vessel.

2. The array of vessels of claim 1, wherein the buoyant material is a water-permeable concrete material.

3. The array of vessels of claim 2, wherein the water-permeable concrete material includes cement, aggregate, and micro glass spheres.

4. The array of vessels of claim 2, wherein the water-permeable concrete material is made from 1 part cement, 1 part lightweight coarse aggregate, 2 parts lightweight fine aggregate, 1 part glass microspheres, and 1 part water.

5. The array of vessels of claim 2, wherein the water-permeable concrete material includes a mixture of cement, glass microspheres, expanded glass aggregate, and microfibers.

6. The array of vessels of claim 5, wherein the mixture includes by weight percent 30-40% cement, 30-35% water, 15-20% glass microspheres, 10-15% expanded glass aggregate, and 0.05% microfibers.

7. An array of vessels for providing a floating aquatic habitat in a body of water comprising:
    at least two vessels, each vessel comprising:
        a curved sidewall; and
        a bottom member coupled to the curved sidewall to define an interior space for holding a growth medium and a plant, the bottom member including one or more channels extending through the bottom member such that a root of the plant may extend through the bottom member and into the body of water,
        wherein the curved sidewall and the bottom member are formed of a buoyant material; and
    a connecting member connecting the at least two vessels together,
    wherein the connecting member has at least two curved edge members shaped to conform to the curved sidewall of each vessel, the connecting member further including a lashing to secure the connecting member to the at least two vessels such that one of the at least two curved edge members abuts the curved sidewall of one of the at least two vessels and the other of the at least two curved edge members abuts the curved sidewall of the other of the at least two vessels, the lashing passing through at least one passage in the curved sidewall of each vessel.

8. The array of vessels of claim 7, wherein the buoyant material is a water-permeable concrete material.

9. The array of vessels of claim 8, wherein the water-permeable concrete material includes cement, aggregate, and micro glass spheres.

10. The array of vessels of claim 8, wherein the water-permeable concrete material is made from 1 part cement, 1 part lightweight coarse aggregate, 2 parts lightweight fine aggregate, 1 part glass microspheres, and 1 part water.

11. The array of vessels of claim 8, wherein the water-permeable concrete material includes a mixture of cement, glass microspheres, expanded glass aggregate, and microfibers.

12. The array of vessels of claim 11, wherein the mixture includes by weight percent 30-40% cement, 30-35% water, 15-20% glass microspheres, 10-15% expanded glass aggregate, and 0.05% microfibers.

13. The array of claim 7, wherein each of the at least two curved edge members is lined with a resilient member and contacts the curved sidewall of the at least two vessels when the connecting member is secured to the at least two vessels.

* * * * *